No. 732,504. PATENTED JUNE 30, 1903.
C. F. BELKNAP.
COMBINED ASH SHOVEL AND SIFTER.
APPLICATION FILED FEB. 3, 1903.
NO MODEL.
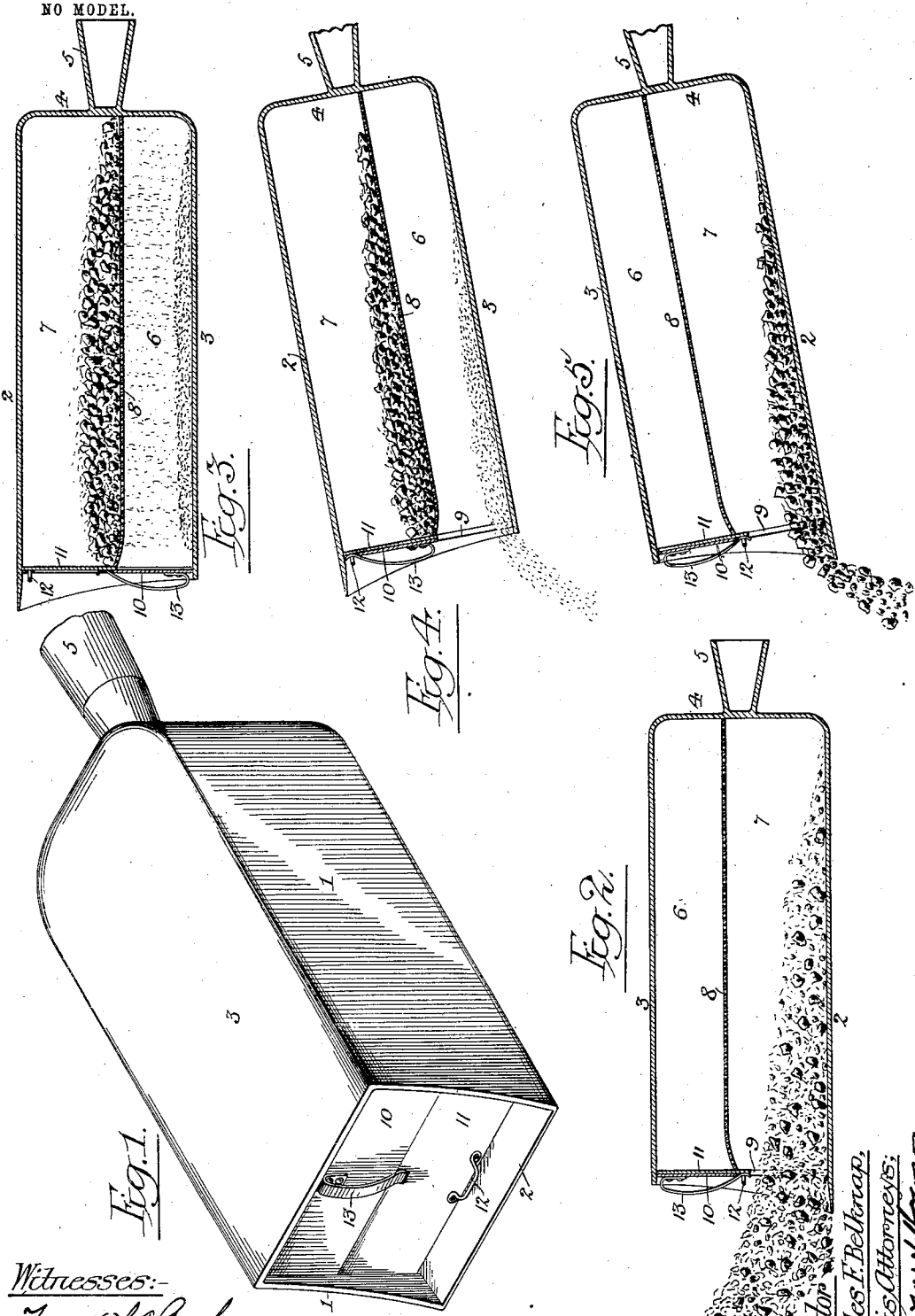

No. 732,504. Patented June 30, 1903.

UNITED STATES PATENT OFFICE.

CHARLES F. BELKNAP, OF PHILADELPHIA, PENNSYLVANIA.

COMBINED ASH SHOVEL AND SIFTER.

SPECIFICATION forming part of Letters Patent No. 732,504, dated June 30, 1903.

Application filed February 3, 1903. Serial No. 141,732. (No model.)

*To all whom it may concern:*

Be it known that I, CHARLES F. BELKNAP, a citizen of the United States, residing in Philadelphia, Pennsylvania, have invented certain Improvements in a Combined Ash Shovel and Sifter, of which the following is a specification.

The object of my invention is to so construct a combined shovel and sifter for ashes that the finer portions of the ashes can be readily separated from the coal and cinders and the two portions independently discharged from the shovel. This object I attain in the manner hereinafter set forth, reference being had to the accompanying drawings, in which—

Figure 1 is a perspective view of a combined shovel and sifter constructed in accordance with my invention. Fig. 2 is a sectional view illustrating the method of using the shovel for taking up ashes. Fig. 3 is a similar view showing the shovel in use as a sifter, and Figs. 4 and 5 are sectional views showing the independent discharge of the separated portions of the ashes from the shovel.

The shovel is a box-like structure of general rectangular form, although such rectangular shape is not essential, the shovel in the present instance comprising sides 1 1, bottom 2, top 3, and a back 4, from which projects a handle 5, whereby the shovel can be conveniently manipulated.

The interior of the shovel is divided into upper and lower chambers 6 and 7 by a screen 8, suitably secured in position within the shovel, the chamber 6 being by preference of less dimensions than the chamber 7, and in grooves 9 in the sides of the shovel at the front end of the same are guided sliding covers 10 and 11, the cover 10 closing the front end of the chamber 6 and the cover 11 closing the front end of the chamber 7. The cover 11 has a projecting lug 12, whereby it can be raised in the grooves 9, and the cover 10 has on its front face a spring 13, which serves the double function of a handle for moving the cover 10 up and down in the groove and also as a means of retaining either cover in the position to which it is adjusted, the free end of the spring bearing against the front face of the cover 11, so that the accidental shaking out of position of either cover is prevented whether the same is closed or open.

In the use of the shovel the cover 11 is first raised, and the ashes are taken up in the ordinary manner in the chamber 7, as shown in Fig. 2, and the cover 11 being then closed the shovel is reversed, so as to dump the contents of said chamber 7 onto the screen 8, agitation of the shovel then effecting the proper separation of the fine portions of the ashes from the coal and cinders, as shown in Fig. 3. The cover 10 is then opened, so as to permit of the discharge of the fine ashes into a suitable receptacle, as shown in Fig. 4, the coal and cinders being retained in the chamber 7 by the cover 11 during such discharge. The shovel is then reversed, the cover 10 closed, and the cover 11 opened, so as to permit the discharge of the coal and cinders from the chamber 7, as shown in Fig. 5.

It will be noted that the grooves 9 in the sides of the shovel are closed at the ends, so that the covers 10 and 11 cannot be slid out of the grooves, the covers being introduced into the grooves in the first instance by springing them into the same. The loss of either cover and the disabling of the sifter, which would result from such loss, are thus prevented, while at the same time the construction of the combined shovel and sifter is of so simple a character that it can be made well within the cost limit imposed upon a practicable article of this character and can be operated without taxing too heavily the intelligence of servants, to whom its operation is in most cases likely to be intrusted. The broader features of my invention may, however, be embodied in a shovel having at the forward end a single cover wide enough to close both chambers and movable in both directions, so as to uncover either chamber.

Having thus described my invention, I claim and desire to secure by Letters Patent—

1. A combined shovel and sifter consisting of a box-like structure having a flattened side to adapt said structure for use as a shovel and provided with a suitable handle and divided by a longitudinal screen into two chambers each of which is closed at the front end by a transversely-sliding cover, substantially as specified.

2. A combined shovel and sifter consisting of a box-like structure having a flattened side to adapt said structure for use as a shovel and provided with a suitable handle and divided by a longitudinal screen into two chambers and having at its forward end independent transversely-sliding covers, one for each chamber, substantially as specified.

3. A combined shovel and sifter consisting of a box-like structure divided by an internal longitudinal screen into two chambers, and transversely-sliding covers, one for each chamber, the edges of both covers being adapted to a single groove in each side of the shovel structure, substantially as specified.

4. A combined shovel and sifter consisting of a box-like structure divided by an internal transverse screen into two chambers each closed at the forward end by a sliding cover whose edges are guided in grooves in the sides of the shovel, one of said covers having a spring-finger bearing upon the other cover, substantially as specified.

In testimony whereof I have signed my name to this specification in the presence of two subscribing witnesses.

CHARLES F. BELKNAP.

Witnesses:
F. E. BECHTOLD,
JOS. H. KLEIN.